(12) United States Patent
Kwan

(10) Patent No.: US 7,731,355 B2
(45) Date of Patent: Jun. 8, 2010

(54) EYEGLASS ASSEMBLY

(75) Inventor: Po Kwong Kwan, Hong Kong (HK)

(73) Assignee: Faith Idea Limited, Hong Kong (CN)

( * ) Notice: Subject to any disclaimer, the term of this patent is extended or adjusted under 35 U.S.C. 154(b) by 0 days.

(21) Appl. No.: 12/406,266

(22) Filed: Mar. 18, 2009

(65) Prior Publication Data

US 2010/0039609 A1 Feb. 18, 2010

(30) Foreign Application Priority Data

Aug. 13, 2008 (CN) .................. 2008 1 0142401

(51) Int. Cl.
*G02C 1/02* (2006.01)
(52) U.S. Cl. .................. 351/110; 351/141; 351/147; 351/149
(58) Field of Classification Search .................. 351/41, 351/64–70, 110, 140–149, 154
See application file for complete search history.

(56) References Cited

U.S. PATENT DOCUMENTS 6,729,725 B1 * 5/2004 Cheng .................. 351/110
6,905,205 B2 * 6/2005 Kim et al. .................. 351/110

* cited by examiner

*Primary Examiner*—Huy K Mai
(74) *Attorney, Agent, or Firm*—William J. Sapone; Coleman Sudol Sapone P.C.

(57) ABSTRACT

An eyeglass assembly 10 is disclosed as including a frame 2 with two brackets 21 each with a recess for receiving part of a respective piece of optical lens 1, and a screw 22 releasably engaged with the bracket 21, each bracket 21 including two protrusions 211, 212 which, when the piece of optical lens 1 is received by the bracket 21, abut a first major surface 4 of the piece of optical lens 1, and when the piece of lens 1 is received by the bracket 21, the screw 22 is adapted to abut an opposite second major surface 6 of the piece of optical lens 1 to thereby releasably engage the piece of optical lens 1 with the bracket 21.

13 Claims, 4 Drawing Sheets

US 7,731,355 B2

EYEGLASS ASSEMBLY

This invention relates to an eyeglass assembly, in particular such an assembly for securing a piece of optical lens with a spectacle frame.

BACKGROUND OF THE INVENTION

Eyeglasses have been available for a long period of time, for assisting people with eye-sight challenges, and also as sunglasses for filtering out at least part of the sunlight in particular during sunny days. However, such prior art eyeglasses usually include a spectacle frame which fixedly secure two pieces of lenses by wholly encircling the lenses. Such a structure significantly increases the weight of the eyeglasses, and thus when a user wears such a pair of eyeglasses, the weight acts on the nose pads of the eyeglasses, and in turn the nose of the user, causing discomfort to the user. There have been recently provided various types of rimless eyeglasses, in which the weight of the eyeglasses is reduced. However, in such rimless eyeglasses, a small hole has to be provided through each lens, e.g. by drilling, and a corresponding hole is provided on the frame. A screw is then screwed through both the hole in the lens and that of the frame to engage the lens to the frame. Such a structure adds to the production process and thus the resultant cost. In addition, as a hole has to be drilled through the lens, and as the process is usually carried out on the spot, such puts a high demand on the skill of the operators. Furthermore, lenses are prone to damage during drilling, and some small fractures may develop around the holes, thus compromising the appearance and structural integrity of the piece of lens.

It is thus an object of the present invention to provide an eyeglass assembly and a pair of eyeglasses including such an eyeglass assembly in which the aforesaid shortcomings are mitigated or at least to provide a useful alternative to the trade and public.

SUMMARY OF THE INVENTION

According to a first aspect of the present invention, there is provided an eyeglass assembly comprising a frame member with means for releasable engagement with at least one piece of optical lens, said engagement means including a bracket with at least one recess for receiving at least part of said piece of optical lens, and a securing member releasably engaged with said bracket, wherein, said bracket includes at least one protrusion which, when said piece of optical lens is received by said bracket, abuts a first major surface of said piece of optical lens, and wherein, when said piece of lens is received by said bracket, said securing member is adapted to abut an opposite second major surface of said piece of optical lens to thereby releasably engage said piece of optical lens with said bracket.

According to a second aspect of the present invention, there is provided a pair of eyeglasses including an eyeglass assembly releasably engaged with at least one piece of optical lens, said eyeglass assembly comprising a frame member with means releasably engaging with said piece of optical lens, said engagement means including a bracket with at least one recess receiving at least part of said piece of optical lens, and a securing member releasably engaged with said bracket, wherein said bracket includes at least one protrusion abutting a first major surface of said piece of optical lens, and wherein said securing member abuts an opposite second major surface of said piece of optical lens to thereby releasably engage said piece of optical lens with said bracket.

BRIEF DESCRIPTION OF THE DRAWINGS

Preferred embodiments of the present invention will now be described, by way of examples only, with reference to the accompanying drawings, in which.

DETAILED DESCRIPTION OF THE PREFERRED EMBODIMENTS

Figure 1:
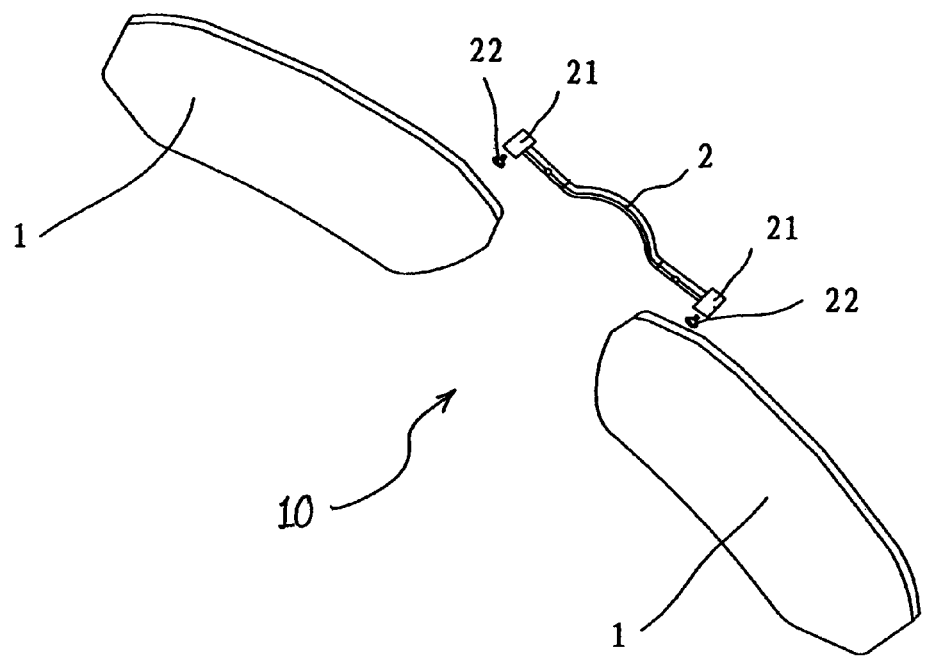
FIG. 1 is an exploded perspective view of a pair of eyeglasses according to a first preferred embodiment of the present invention.
Figure 2A:
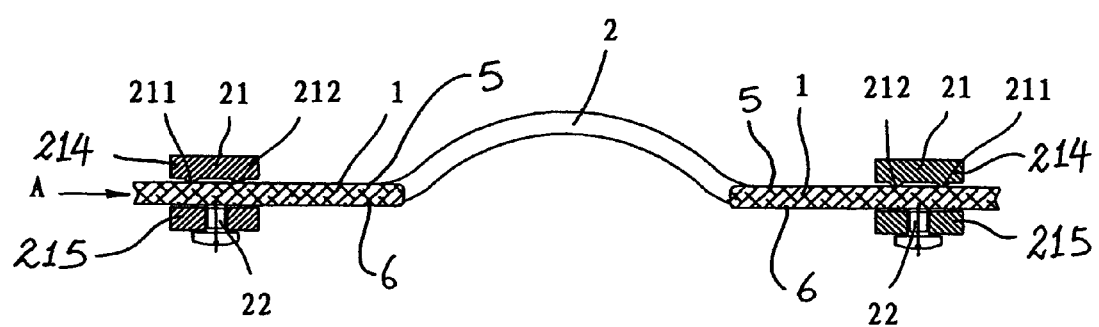
FIG. 2A is a schematic structural diagram of the pair of eyeglasses of FIG. 1.

FIGS. 1 and 2A show a first preferred embodiment of a pair of eyeglasses according to a first preferred embodiment of the present invention, which pair of eyeglasses generally designated as 10. The pair of eyeglasses 10 include a generally elongate lens frame 2 with two longitudinal ends, each provided with a bracket 21 for releasably holding a piece of optical lens 1. As shown more clearly in FIG. 2A, each of the brackets 21 has two walls 214, 215 which face each other, are parallel to each other, and are spaced apart from each other. It can also be seen from FIG. 2B that the two walls 214, 215 are integrally formed with each other.

A recess is formed between the walls 214, 215 of each bracket 21 for receiving part of an upper edge of a respective piece of optical lens 1. For each bracket 21, on a surface of the wall 214 facing the wall 215 are formed two protrusions 211, 212, both extending towards the wall 215. It can be seen that when the piece of optical lens 1 is received within the recess between the walls 214, 215 of the bracket 21, the two protrusions 211, 212 abut, contact and bear on a first major surface 5 of the lens 1. The free ends of the protrusions 212, 212 may be curved or pointed, for obtaining good contact and engagement with the major surface 5 of the lens 1.

Through the wall 215 of each bracket 21 is drilled a threaded hole for releasable threaded engagement with a screw 22. Thus, when the piece of optical lens 1 is received within the recess between the walls 214, 215 of the bracket 21, the screw 22 is threadedly movable relative to the bracket 21 towards the wall 214 to abut, contact and bear on a second major surface 6 of the piece of lens 1 which is opposite the first major surface 5. The free end of the screw 22 is curved to generally correspond to the curvature of the second major surface 6. By way of such an arrangement, the piece of lens 1 is releasably engaged and secured with the bracket 21, and thus the frame 2, by the protrusions 211, 212 and the screw 22. For better engagement between the bracket 21 and the piece of lens 1, the mid-point between the two protrusions 211, 212 lies on a longitudinal axis of the screw 22.

Figure 2B:
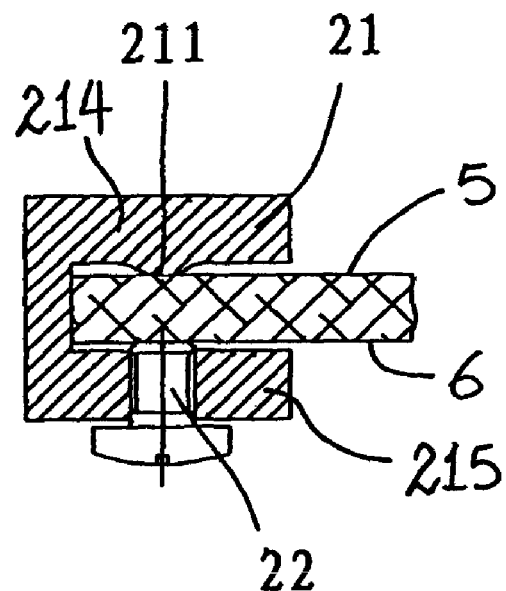
FIG. 2B is a view of the pair of eyeglasses of FIG. 2A taken in the direction of arrow A in FIG. 2A.
Figure 3:
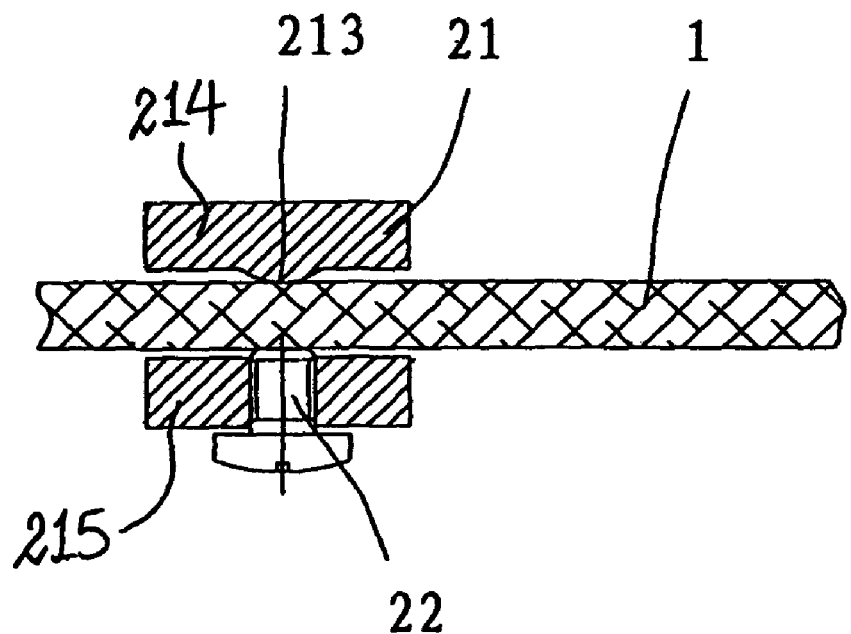
FIG. 3 is a schematic structural diagram of a pair or eyeglasses according to a second preferred embodiment of the present invention.

FIG. 3 shows the manner of engagement of the piece of lens 1 with a spectacle assembly according to a second preferred embodiment of the present invention, in which structures also present in the embodiment shown in FIGS. 1 to 2B above are designated by the same reference numerals as in FIGS. 1 to 2B. It can be seen that, in contrast to the first preferred embodiment, in this second preferred embodiment, only one protrusion 213 is provided on the surface of the wall 214 facing the wall 215 of each bracket 21. As compared with the protrusions 211, 212 in the embodiments shown in FIGS. 1 to 2B, the free end of the protrusion 213 is broader, so as to ensure better contact with the piece of lens 1. In addition, the protrusion 213 is arranged to lie on the longitudinal axis of the screw 22.

Figure 4:
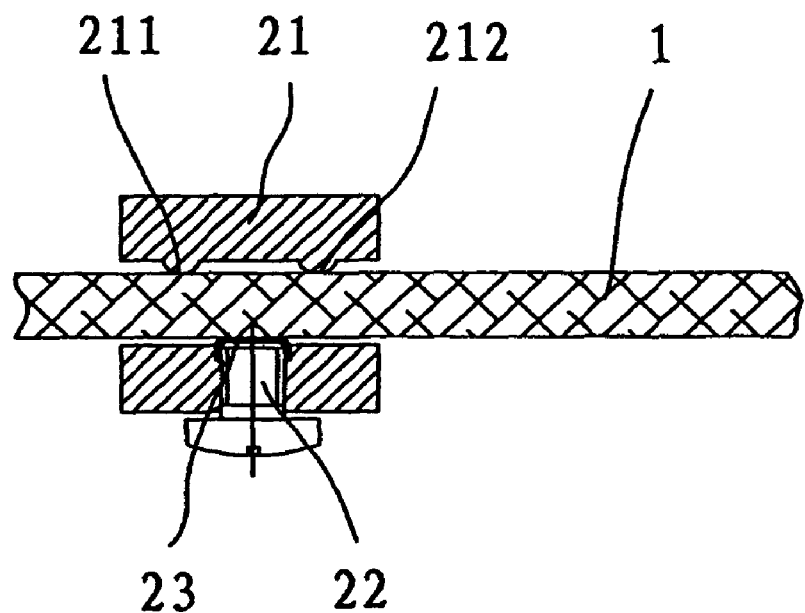
FIG. 4 is a schematic structural diagram of a pair or eyeglasses according to a third preferred embodiment of the present invention.

FIG. 4 shows the manner of engagement of the piece of lens 1 with a spectacle assembly according to a third preferred embodiment of the present invention, in which structures also present in the embodiment shown in FIGS. 1 to 2B above are designated by the same reference numerals as in FIGS. 1 to 2B. A major difference in this third embodiment is that a layer of soft material 23 is provided at the free end of the screw 22 for contacting the piece of optical lens 1. Such an arrangement, on the one hand, facilitates engagement between the screw 22 and the piece of lens 1, and, on the other hand, reduces the risk of the screw 22 damaging the lens 1 during installation.

Figure 5:
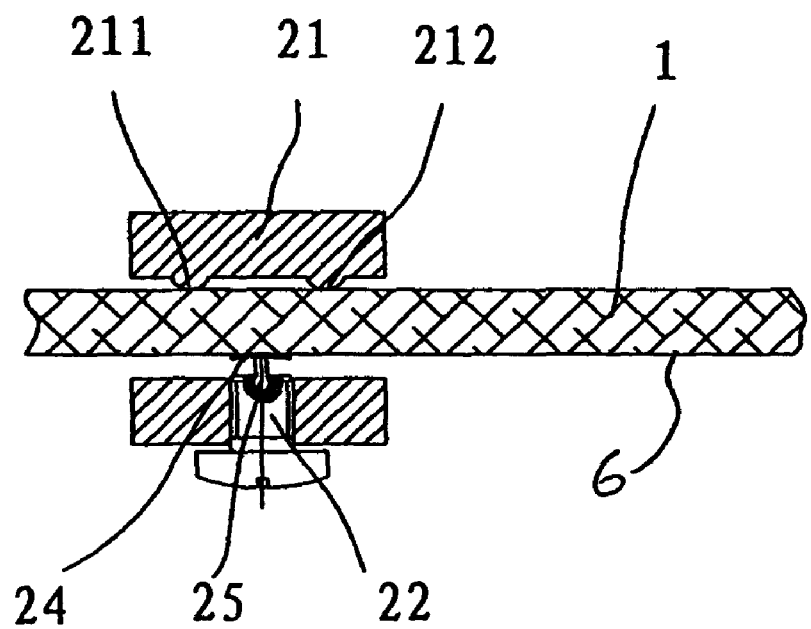
FIG. 5 is a schematic structural diagram of a pair or eyeglasses according to a fourth preferred embodiment of the present invention.

FIG. 5 shows the manner of engagement of the piece of lens 1 with a spectacle assembly according to a fourth preferred embodiment of the present invention, in which structures also present in the embodiment shown in FIGS. 1 to 2B above are designated by the same reference numerals as in FIGS. 1 to 2B. In this fourth preferred embodiment, the screw 22 is pivotally engaged with a contact element 24 via a connection arrangement 25. The contact element 24 may be triangular or square in shape, or is curved to correspond to the curvature of the major surface 6 of the piece of lens 1 which it abuts. By way of such an arrangement, one may adjust the degree of contact between the contact element 24 and the lens 1, depending on the relative position between the lens 1 and the bracket 21.

Figure 6A:
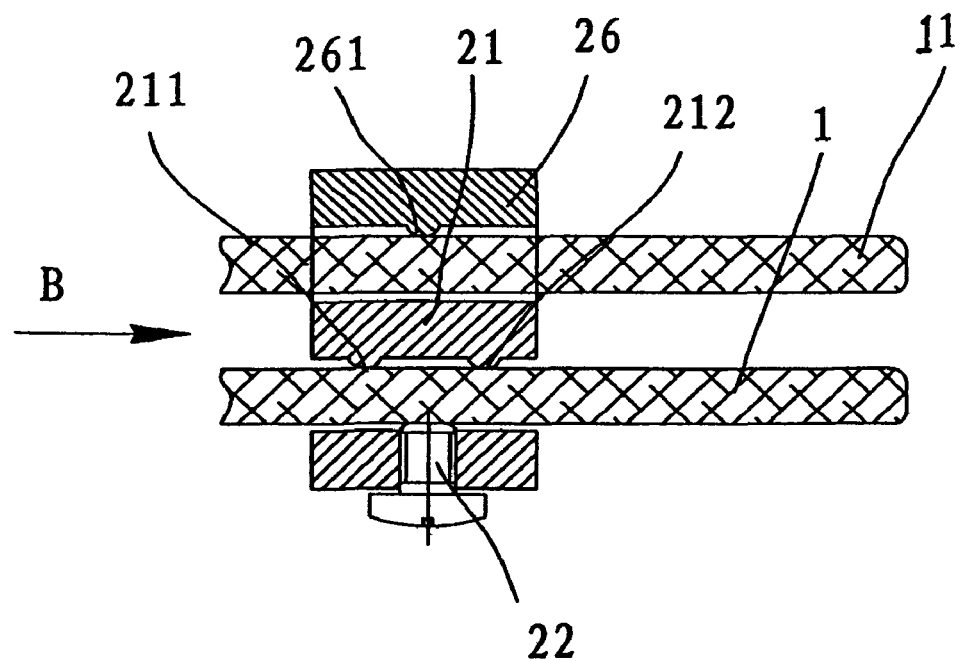
FIG. 6A is a schematic structural diagram of a pair of eyeglasses according to a fifth preferred embodiment of the present invention.
Figure 6B:
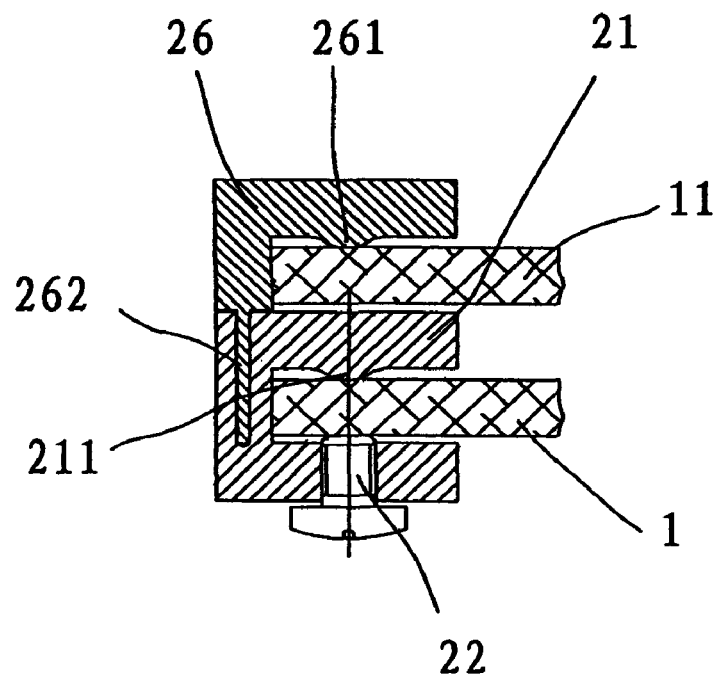
FIG. 6B is a view of the pair of eyeglasses of FIG. 6A taken in the direction of arrow B in FIG. 6A.

As shown in FIGS. 6A and 6B, the pair of eyeglasses 10 shown in FIGS. 1 to 2B may be further modified. In particular, a clamping member 26 may be releasably engageable with the bracket 21 for releasably holding at least a further piece of optical lens 11. As shown in FIGS. 6A and 6B, the clamping member 26 has an extension 262 releasably received within a channel in the bracket 21 for engaging the clamping member 26 with the bracket 21. A piece of optical lens 11 is engaged within a recess formed between the clamping member 26 and the bracket 21, and is kept in place by a protrusion 261 on a side of the clamping member 26 facing the bracket 21. By way of such an arrangement, an additional piece of optical lens 11 may be selectively positioned in front of each piece of optical lens 1. For example, the additional piece of optical lens 11 may be a piece of sunglass lens. Alternatively, it is possible to form this modified arrangement by forming a channel in the clamping member 26 within which an extension of the bracket 21 may be received.

It should be understood that the above only illustrates examples whereby the present invention may be carried out, and that various modifications and/or alterations may be made thereto without departing from the spirit of the invention. For example, the above engagement structure may be equally employed in the engagement between temples and eyeglass lenses.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. An eyeglass assembly comprising a frame member with means for releasable engagement with at least one piece of optical lens, said engagement means including:
   a bracket with at least one recess for receiving at least part of said piece of optical lens, and
   a securing member releasably engaged with said bracket,
   wherein, said bracket includes at least one protrusion which, when said piece of optical lens is received by said bracket, abuts a first major surface of said piece of lens, and
   wherein, when said piece of optical lens is received by said bracket, said securing member is adapted to abut an opposite second major surface of said piece of optical lens to thereby releasably engage said piece of optical lens with said bracket.

2. An assembly according to claim 1 wherein said securing member is movable relative to said bracket.

3. An assembly according to claim 1 wherein said bracket has first and second wall members facing each other, wherein said protrusion is provided on a surface of said first wall member facing said second wall member, and wherein a through-hole is provided through said second wall member for receiving said securing member.

4. An assembly according to claim 3 wherein said through-hole is threaded and said securing member is a screw.

5. An assembly according to claim 4 wherein an end of said screw adapted to abut said second major surface of said piece of optical lens is curved.

6. An assembly according to claim 4 wherein an end of said screw adapted to abut said second major surface of said piece of optical lens is provided with a soft material.

7. An assembly according to claim 4 wherein an end of said screw adapted to abut said second major surface of said piece of optical lens is pivotally engaged with a contacting part for abutting said second major surface of said piece of optical lens.

8. An assembly according to claim 1 wherein said securing member has a longitudinal axis and said protrusion of said bracket lies on said longitudinal axis of said securing member.

9. An assembly according to claim 1 wherein said bracket includes at least two protrusions, and the mid-point between said two protrusions lies on a longitudinal axis of said securing member.

10. An assembly according to claim 1 wherein said engagement means includes two brackets each with at least one recess for receiving at least part of a respective piece of optical lens and a securing member releasably engaged with each said bracket.

11. An assembly according to claim 1 further including a holder for holding at least a second piece of optical lens, said holder including an extension releasably engaged within a recess of said frame member.

12. An assembly according to claim 1 further including a holder for holding at least a second piece of optical lens, wherein said frame member includes an extension releasably engaged within a recess of said holder.

13. A pair of eyeglasses including an eyeglass assembly according to claim 1 releasably engaged with at least one piece of optical lens, wherein said protrusion abuts a first major surface of said piece of optical lens, and said securing member abuts an opposite second major surface of said piece of optical lens.

* * * * *